W. H. YOUNG.
COMBINATION AUTOMOBILE WHEEL AND TIRE.
APPLICATION FILED OCT. 20, 1915.

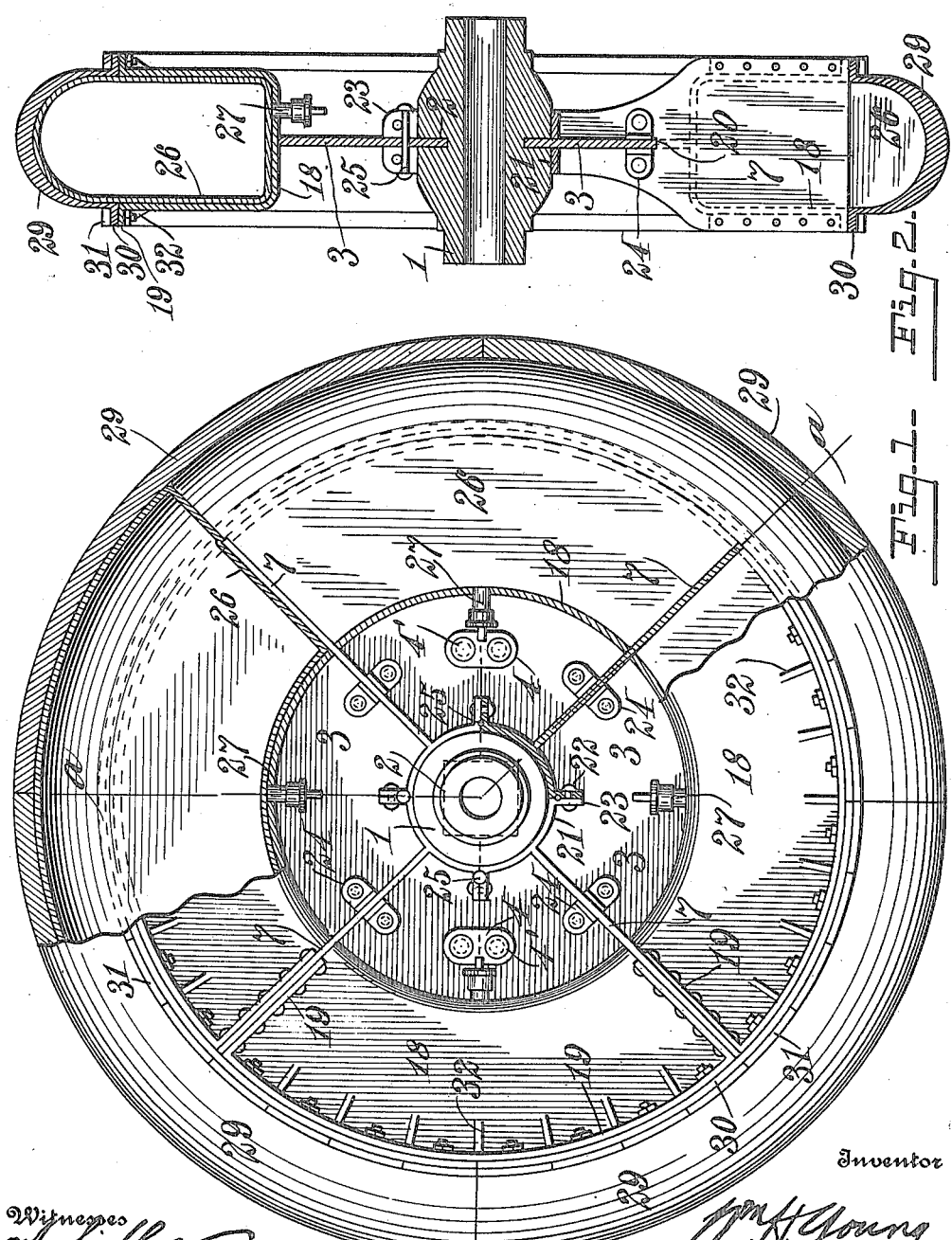

1,180,219.

Patented Apr. 18, 1916.
5 SHEETS—SHEET 2.

Witnesses
M. Liebler
N. Galloway

Inventor
Wm. H. Young
By R. J. McCarty
his Attorney

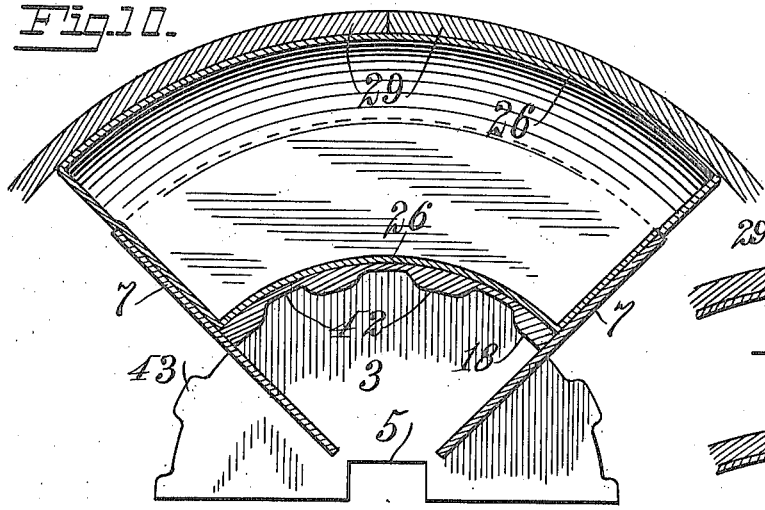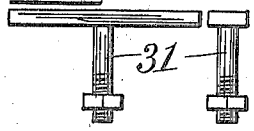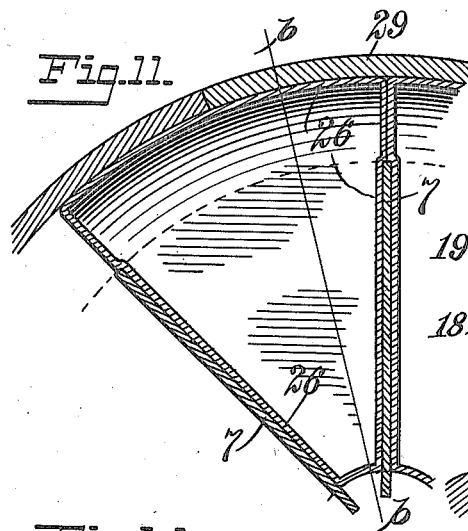

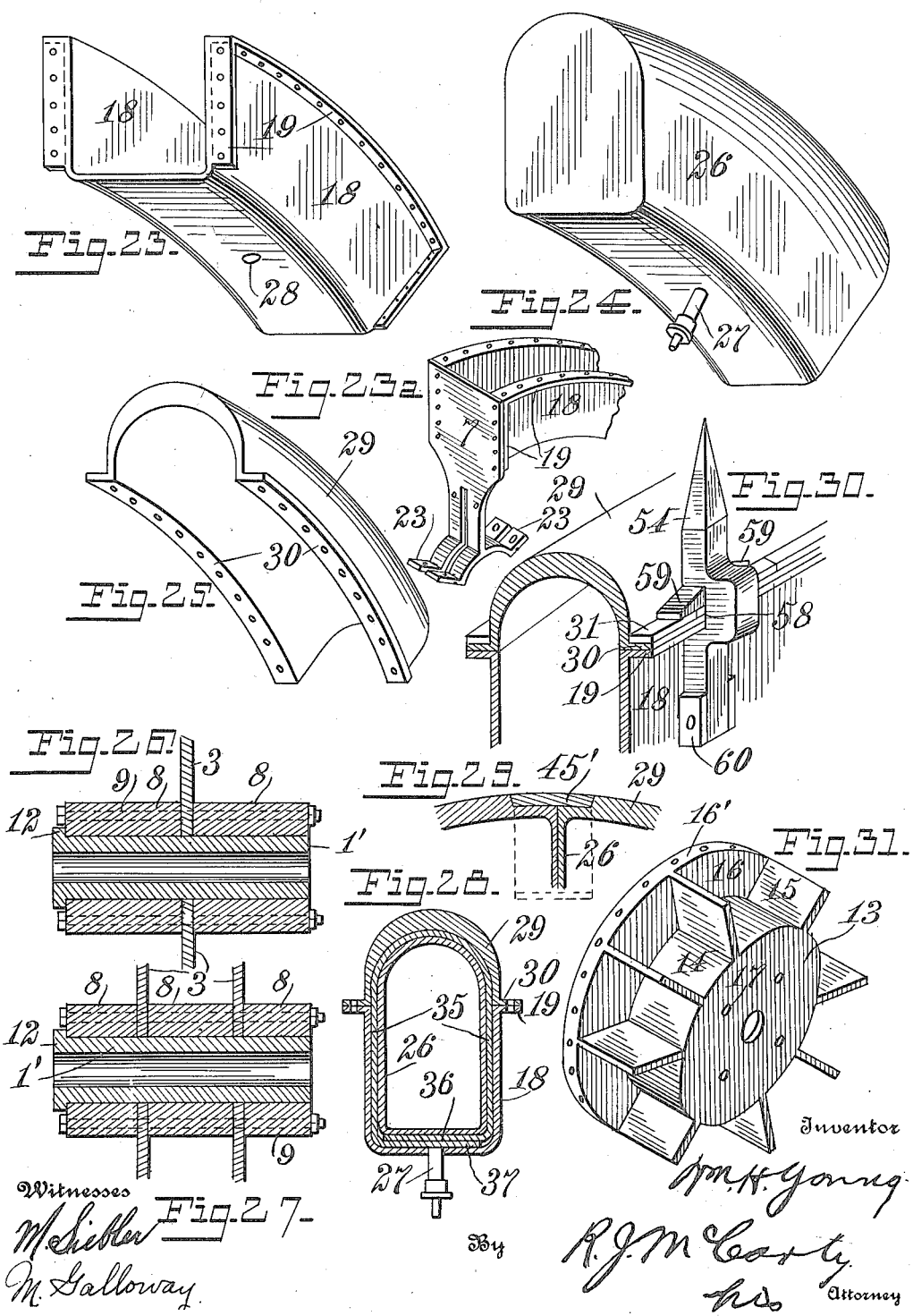

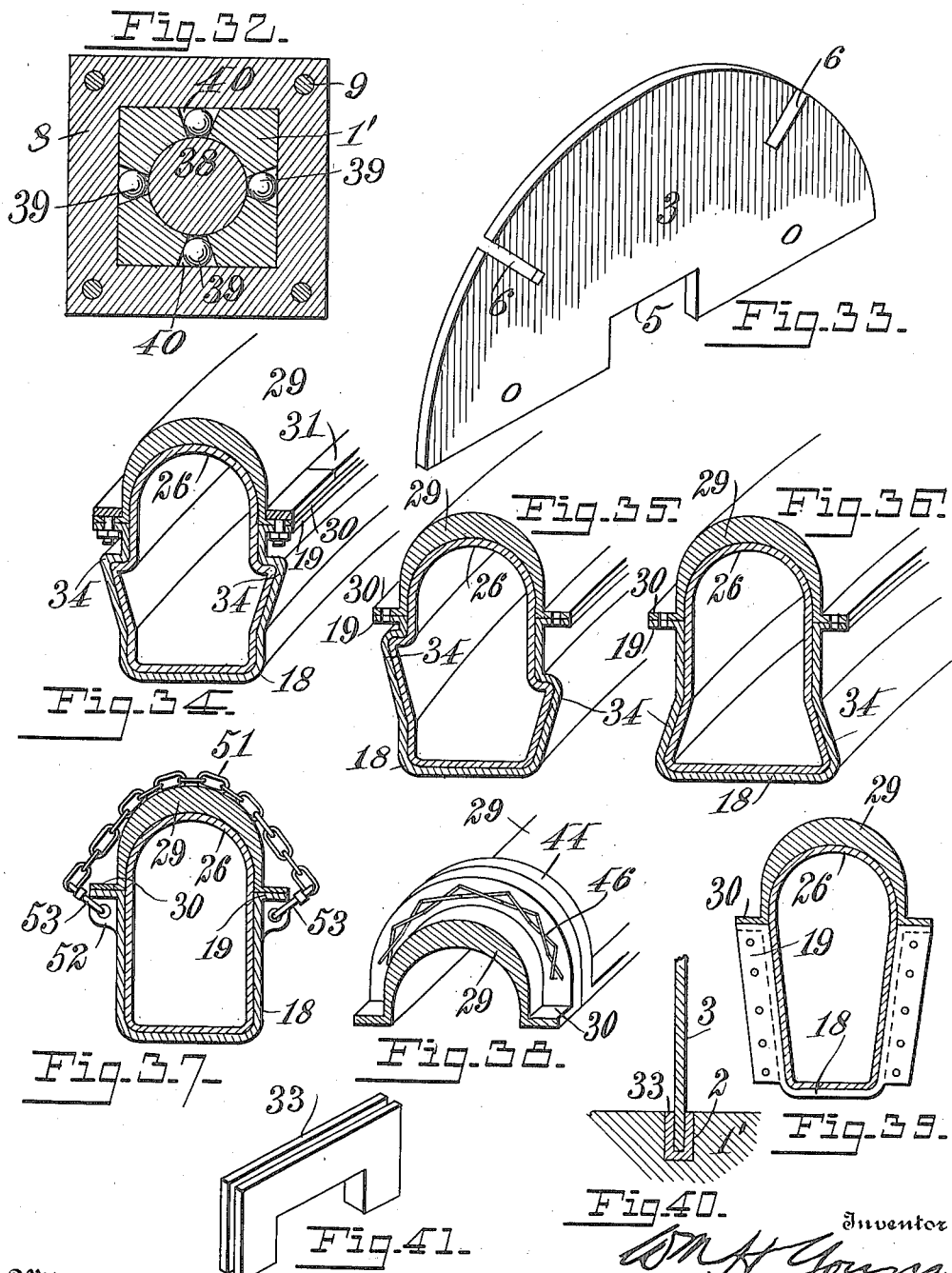

UNITED STATES PATENT OFFICE.

WILLIAM H. YOUNG, OF DAYTON, OHIO.

COMBINATION AUTOMOBILE WHEEL AND TIRE.

1,180,219.  Specification of Letters Patent.  Patented Apr. 18, 1916.

Application filed October 20, 1915. Serial No. 56,862.

*To all whom it may concern:*

Be it known that I, WILLIAM H. YOUNG, a citizen of the United States, residing at Dayton, in the county of Montgomery and State of Ohio, have invented certain new and useful Improvements in Combination Automobile Wheels and Tires; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to new and useful improvements in automobile and vehicle wheels whether of heavy or light draft.

The invention involves the wheel structure in its entirety and may be properly termed a combination automobile wheel and tire.

The object of my invention is to provide a sectional wheel structure or one in which sections of both the wheel and tire may be readily removed and replaced without necessitating the removal of more than the particular section which it is desired to repair or replace.

A further object of my invention is to provide a wheel which is in its entirety of substantial construction and durability and the weight of which is comparatively light.

These and other features of the invention will appear from the detail description to follow in connection with the accompanying drawings.

Figure 3:
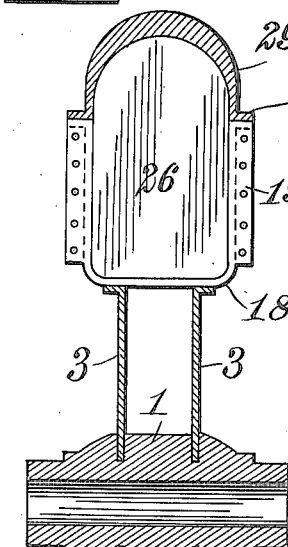
Figure 4:
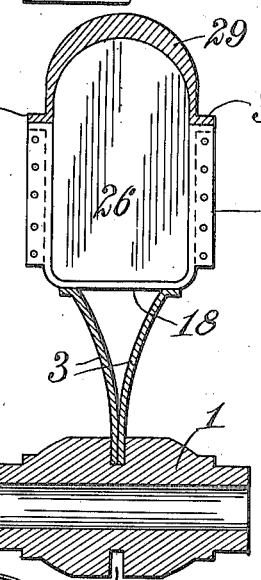
Figure 5:
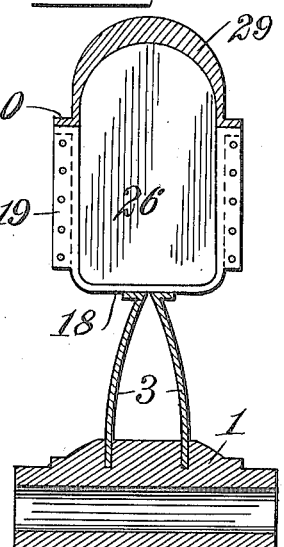

In the accompanying drawings, Figure 1 is a side elevation of a wheel constructed in accordance with my invention, a portion thereof being broken away and shown in section to better reveal the structure of the same. Fig. 2 is a sectional view on the line *a—a* of Fig. 1. Figs. 3, 4 and 5 are sectional views in detail showing various modifications or forms of the disks which unite the hub to the pans forming the wheel rim or felly. Figs. 6, 7, 8 and 9 are various views in perspective and section showing details of modified forms of a sectional hub and the manner of uniting the wheel disks thereto. Fig. 10 is a sectional view of a detail modification showing a certain driving or stability connection between the wheel disks and the bottom of one of the pans or rim sections. Fig. 11 is a detail modification showing a construction in which the pans or rim sections extend to the hub and are united thereto, the wheel disk or disks being in this case eliminated. Fig. 12 is a section on the line *b—b* of Fig. 11. Fig. 13 is a detail view of one of the bolts shown in Fig. 1 by means of which the outer casing is attached to the pans or rim sections. Figs. 14 and 15 are sectional views showing modifications in the methods of reinforcing the abutting ends of the sections forming the outer casing. Figs. 16 and 17 are detail sectional views showing means for preventing friction between the inner surface and the outer sections forming the casing and the air bags within the pans or rim sections. Fig. 18 is a detail sectional view of one of the sections of the outer casing and a portion of an air bag and a pan or rim section associated therewith. This view is for the purpose of illustrating a form of anti-skidding attachment consisting of a series of spurs which may be arranged at various points around the outer casing sections. Figs. 19 and 20 are detail modifications of the same idea showing a flanged anti-skidding attachment adapted to be placed around the outer side of the casing sections in a manner similar to Fig. 18. Figs. 21 and 22 are detail views showing the application of means for preventing a slipping of the wheel in passing over icy roads, the same consisting of a spike which may be attached at convenient points around the wheel so as to extend in positions to engage the surfaces over which the wheel is passing. Fig. 23 is a perspective view of one of the pans forming the sectional wheel rim or felly. Fig. 23ª is a perspective view of a portion of one of the pans and a division plate. Fig. 24 is a similar view of one of the air bags which is received by one of the pans as shown in Fig. 23. Fig. 25 is a similar view of one of the sections of the outer casing which incloses one of the air bags as shown in Fig. 24 and as united to one of the pans as shown in Fig. 23. Figs. 26 and 27 are sectional details showing modifications in the construction of the hub and the manner of uniting the wheel disks thereto. These views are analogous to views 7 and 8 on Sheet 2. Fig. 28 is a sectional view through one of the pans forming the sectional wheel rim or felly, an inner casing section, an outer casing section and an air bag, this structure being a modification to the extent of the employment of an inner casing which incloses the air bag. Fig. 29 is a detail section showing means for sealing the joint between the sectional outer casing and the air bags and in which construction the outer casing and air bag are made in one member. Fig. 30 is a perspective view showing a modified form of anti-slipping device for the prevention of slipping of the wheels in passing over icy roads or streets. This illustration is analogous to Figs. 21 and 22 and shows a different way of mounting or attaching the anti-slipping members. Fig. 31 is a perspective view showing a construction in which the pans, the division plates and the wheel disks are formed or constructed in one integral member. Fig. 32 is a sectional view of a form of hub showing the application of ball-bearings thereto. Fig. 33 is a perspective view of one-half of the wheel disk which is interposed between the hub and the rim pans shown in Figs. 1 and 2 and various other views of the drawings. Figs. 34, 35 and 36 are similar sections showing various modifications in the construction of the pans or sections of the wheel rim whereby the air bags are held in position against any possible effect thereon due to centrifugal force. Fig. 37 is a cross-sectional view of one of the sections of the rim of the wheel as shown in Figs. 1, 2, 23, 24 and 25, with the application of an anti-skidding device in the form of a chain and is a modification of the means shown in Figs. 18 and 20. Fig. 38 is a detail view showing means for uniting the abutting ends of the outer casing sections consisting of lacing. Fig. 39 is a cross-sectional view through one of the rim sections showing the pan constituting one of the elements of this section in end elevation. This shows a tapered form of the wheel rim in cross-section which is preferred to that shown in Figs. 2 and 37. Fig. 40 is a sectional view of a portion of the hub and the wheel disk showing a modification in the mounting of the wheel disks in the hub. Fig. 41 is a detail perspective view of one section of the hub socket which is utilized in the mounting of the wheel disk as shown in Fig. 40.

There may be other modifications in the various structures and relating to various details without departing from the fundamental principles of my invention, the objects and purposes of which have been hereinbefore stated.

In a detail description of my improvements in connection with the various illustrations which have been briefly identified above, similar reference characters will denote corresponding parts in the several illustrations.

Referring to the hub of the wheel, this is shown in Figs. 1, 2, 3, 4 and 5, Sheets 1 and 2, to consist of an oblong annular hub 1 of varying diameters and having the usual longitudinal opening for the reception of the axle of the wheel. In Figs. 2 and 4, this round form of hub is shown with an annular groove 2 in the middle of the periphery, while in Figs. 3 and 5, two of such grooves are shown spaced apart. 3—3 designate two segmental plates which are united to form a disk the inner edges of which extend into the central peripheral groove 2 of the hub 1. The groove 2 in the hub terminates in a square. In effect, this disk performs the functions of the spokes of a wheel in that it unites the rim of the wheel with the hub. The two halves 3—3 which, as before stated, form the wheel disk, may be united at their abutting edges in any suitable manner. In the drawings I have shown apertured plates 4 arranged on opposite sides across said abutting edges and united by means of rivets 4'. The inner edges of each of the sections 3 of the wheel disk have alined openings 5 surrounded by square edges which engage the square edges in the hub at the terminal of the groove 2. The circumference of the wheel disk is provided with radial slots 6 which receive the bifurcated ends of a series of division plates 7, to be again more fully described. Of course it will be apparent that the wheel disk so constructed of the two segments 3—3 may be made of a greater number of segments. It is however, preferred to construct the same of two segments. Referring to certain modifications of the round form of the hub as shown in Figs. 3, 4 and 5, two wheel disks 3—3 may be employed to connect the rim sections with the hub. These wheel disks 3—3 are spaced apart, as shown in Fig. 3, and fit in two annular grooves 2 in the hub in a manner similar to that described in connection with Figs. 2 and 33. In Fig. 4 two wheel disks are shown inserted in the single peripheral groove 2 with the outer portions of said disks spread apart. In Fig. 5 the inner portions of the said two wheel disks are shown spread apart and inserted in two peripheral grooves 2 in the hub, while the outer portions of said wheel disks are brought together at the rim of the wheel in a manner the reverse of that shown in Fig. 4. The employment of these modifications adds greater strength to the wheel between the rim and the hub and may be advisable in the construction of wheels for heavy draft purposes.

Figure 6:
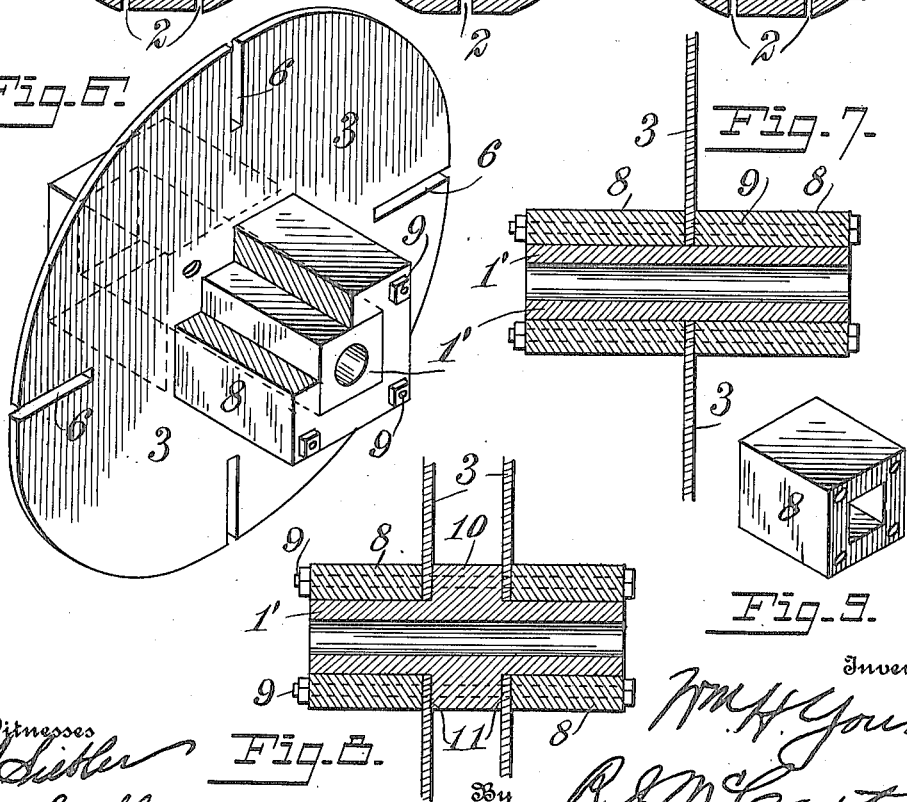
Figure 7:
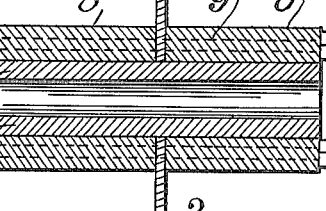
Figure 9:
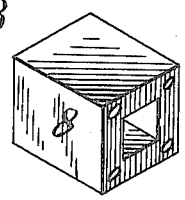
Figure 8:
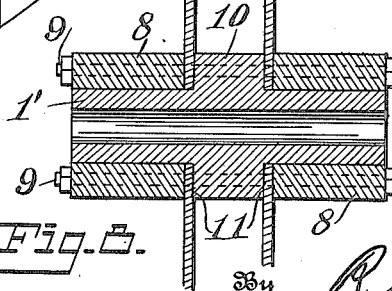

In Figs. 6, 7 and 8, Sheet 2, modifications are shown in the hub construction and in the manner of mounting the wheel disk thereon which in this case is constructed in one integral member. In Figs. 6 and 7, the hub 1' is shown to be rectangular in cross-section and oblong with the longitudinal opening therethrough for the axle. In Fig. 32, Sheet 5, the square top of the hub is shown provided with anti-friction bearings for the axle 38, said anti-friction bearings consisting of balls 39 which are placed in races 40 in the hub 1'. The disk is mounted in the center of the hub, and is clamped in position between two rectangular clamps or boxes 8 which slip over opposite ends of the hub 1' and are held together with the wheel disk between them by bolts 9. In Fig. 8 the hub 1' is square in cross-section and has a peripheral square offset 10 forming two shoulders 11 against which the inner portions of two wheel disks 3—3 abut. The boxes 8 fit over the ends of the hub 1' and clamp the wheel disks 3—3 against the shoulders 11, said boxes 8 being secured by the bolts 9 which pass through openings in the wheel disks and the annular offset 10 of the hub.

In Fig. 26, Sheet 4, the square hub 1' is shown with an annular flange 12 formed at one end against which one of the boxes 8 abuts. In this form of construction the bolt 9 penetrates openings in said boxes and in the inner portions of the wheel disk 3. The construction shown in Fig. 27 is similar to Fig. 26 with the exception that there are three boxes 8 slipped over the hub 1' with two wheel disks held between their adjacent ends on the hub. The hub in this particular construction has the end flange 12 which forms an abutment for one of the boxes 8.

Referring to Figs. 40 and 41, means is there shown for lining the groove 2 in the hub and inserting the edges of the wheel disk 3 in the socket formed by said lining. In Fig. 41, 33 designates one-half of the lining for said slot which is inserted in one-half of the hub, the hub being rectangular in cross-section as shown in Figs. 6 and 7. The other half is similar to Fig. 41 and when the parts are so inserted in the groove in the hub the edges of the wheel disk are inserted in the slot lying between the sides of said lining members 33.

Referring now to certain modifications in the structure of the wheel disk 13, reference is made to Fig. 31, Sheet 4, which shows in perspective the wheel disk to consist of one integral plate which has an overturned or lateral rim 14 from which project radial blades 15 that integrally unite with an outer plate 16. There are two of these structures shown in Fig. 31 arranged together and united by any suitable means such as bolts which pass through openings 17 in the disks 13. The radial blades 15 provide in this construction a series of pans, to be presently referred to in connection with Figs. 1, 2, 23, 24 and 25. The end plates 16 have their peripheries turned over to form flanges 16' which may be termed the metal tire or rim. To these flanges 16' the margins 30 of the segmental casing sections 29 are attached. It will be understood that the pans or chambers formed by the walls 14, 15 and 16 receive the air bags 26. Referring now to Figs. 1, 2 and 23, a series of pans 18 of oblong curvilinear form and open at the tops is arranged around the periphery of the disk 3. These pans are flanged as at 19 throughout their free edges and are united in the wheel structure as shown in Fig. 1 by means of a series of division plates 7, before referred to in connection with the wheel disk 3. The tops of the plate 7 lie behind the end flanges 19 of the pans and under the top flanges 19 of said pans and serve as supports for the metal flanged tire ends. The said flanges may be strengthened around the sides of the pans by means of gussets 32 which are formed on the outer sides of the pans between the flanges and the sides of said pans. This feature is shown in Fig. 1 of the drawings which shows the complete wheel. The inner ends of these division plates are bifurcated or slotted as at 20 to receive slotted portions of the wheel disk 3 and the inner portions of said division plates terminate in curved extensions 21 which embrace the periphery of the hub 1 and are united around said periphery by means of rivets 22 which penetrate openings in flanges 23 which extend from the curved portions 21 of said division plates 7. These division plate extensions 21 when assembled and united around the hub constitute a hub band. The division plates 7 spread outwardly at their outer portions and are narrowed at their inner portions. The said outer portions are wide enough to reach across the end of the pan as shown in Fig. 23 including the end flanges 19 thereof and they terminate at the flange edges of said pans. They are united between the abutting edges of the pans by means of rivets which penetrate the flanges 19 and the portions of the division plates lying therebetween. These pans 18 when thus united in the wheel structure form a sectional felley or rim and each pan constitutes a receptacle for the pneumatic or cushion tire which is likewise sectional in that each part thereof is received by its respective receptacle or pan 18. The wheel disk 3 is united to the division plates 7 by means of a series of apertured socket plates 24 which are united to said disk and division plates by rivets 125 or bolts passing through apertures in the extensions thereof. The said wheel disk is further united to the flanges of the division plates by bolts or rivets 25 which pass through the flanges 23 of the division plates at right angles to the rivets or bolts 22; see Fig. 2. The wheel disk and the division plates are in this manner firmly united and the pans are likewise firmly united to the division plates. The means for uniting these various parts of the wheel structure are rivets. Placed in each of these pans or receptacles 18 is an air bag 26 constructed of any suitable material which is adapted to the uses and purposes of a wheel of this character. In Fig. 24, this air bag is shown inflated and of a size and shape to be received by the pan 18, there being a valve 27 connected with the bottom of the said bag which extends through an opening 28 in the bottom of the pan 18. It may be here stated that any suitable elements to form a cushion tire may be placed in the pans 18 such, for example, as a solid elastic rubber member, or any other suitable material may be used in these pans, it being of course preferable to use a solid rubber segment or an inflatable segment or bag as I have shown in Fig. 24.

As shown in Figs. 2 and 25, Sheets 1 and 4, 29 designates a section of the outer casing which is constructed of suitable material to serve the purposes and uses of an outer casing. This section 29 has its longitudinal edges 30 terminating in flanges which are united to the flanges 19 of the pan 18 by bolts. All other portions of the wheel structure consisting of united parts are riveted in their connection but in the matter of the outer casing sections, these are united to the pans by bolts which afford a more ready disconnection of the parts whenever it becomes necessary to repair or replace one of the air bags. The bolts used in this connection have elongated heads 31 which abut with each other in extending around the rim of the wheel, as shown in Fig. 1, and are thus locked against turning. Referring to Fig. 39, Sheet 5, the pan 18 shown therein has its side walls tapered inwardly. This is the preferred form of the rim sections and in all other respects these elements are substantially the same as those shown in Figs. 1 and 23. Also illustrated on Sheet 5, Figs. 34, 35 and 36, are several modifications of the construction of the pans or rim sections in which shoulders 34 are formed at opposite sides of said pans. These shoulders are engaged by inflated bags and the effect thereof is to hold the bags at two points, to-wit, on opposite sides of the rim, against any tendency to shift outwardly under the influence of centrifugal force should there be such tendency. In one of these figures of the drawing, the shoulders 34 are shown opposite each other. In Fig. 35 they are shown out of alinement, while in Fig. 36 the shoulders 34 are formed by tapering outwardly the bottoms of the pans beyond the upper sides thereof. In Fig. 28, Sheet 4, an innerliner 35 is placed in each pan. This innerliner lies between the pan and the outer casing and the air bag 26. In this particular construction of the innerliner 35, its lower ends 36 and 37 overlap each other and extend to the sides of the metal pans. This element of an innerliner may be placed in the pans to surround the air bags as a means of protection to the latter. In order to avoid any possibility of the disks 3 shifting in their positions a construction is shown in Fig. 10, Sheet 3, wherein the bottoms of the pans 18 are provided with a series of corrugations 42 and the periphery of the wheel disk 3 is likewise provided with a series of corrugations 43 which match those of the pan and the two members become interlocked when the pans are placed in position. A modification is shown in Figs. 11 and 12, Sheet 3, wherein the wheel disk 3 is eliminated and the pans constituting the rim section extend to the hub and are united to the hub directly. The pans 18 in this case form the side walls of the structure from their outer ends to the hub, said side walls being extended into suitable grooves in the hub or united in any suitable manner with said hub. In Figs. 16 and 17 the inner periphery of the outer casing sections is shown corrugated longitudinally to provide means for preventing any possible shifting of the air bag said air bag being forced into said corrugations under the pressure of the air within them. Fig. 17 is a modification of the structure shown in Fig. 16, the corrugations in the inner surface of the outer sections forming the covering being crosswise instead of longitudinal. In Figs. 14 and 15, I have shown means for preventing dust or sand from finding their way at the abutting edges of the sections 29 forming the outer casing. In Fig. 14, the abutting edges of the sections of the outer casing have outwardly extended transverse flanges 44 which increase the thickness of the casing at those points and come together in a tight fit. These flanges may be firmly drawn together by lacing 46 as shown in Fig. 38, Sheet 5. In Fig. 15, these marginal enlargements 44 are shown as extended inwardly and to be of rounded form instead of extended upwardly and of rectangular form. Fig. 29, Sheet 4, shows still another modification in which each casing section 29 and each air bag 26 are made to operate as though in one integral part. The abutting ends of the said casing sections are sealed by a strap 45' of any suitable material such as rubber vulcanized with fabric which overlaps the joint and the ends of which are secured to the side flanges of the pans 18. It will be apparent that various other modifications relating more or less to details may be resorted to without departing from the under-lying principles of my invention which have for their object the provision of a wheel which is most durable and substantial in its construction, of minimum weight and of such a character as to admit of easily detaching the sections of the outer casing to permit of the removal of an air bag whenever necessity requires.

Referring now to various forms of means for preventing skidding or slipping of the wheel, in Fig. 18, Sheet 3, I have shown such means to consist of a curved band 47 any suitable number of which may be arranged transversely around the outer side of the outer casing sections and provided with a series of spurs 48. The bands 47 from which these spurs project have their ends terminated in flanges 49 which are united to the side flanges 19 of the pans 18 above the flanges 30 of the outer casing sections. In Figs. 19 and 20 this anti-skidding means consists of a continuous rib 50 which projects from the curved band 47 instead of the series of pins as shown in Fig. 18. A still further modification of anti-skidding means which may be conveniently applied to my improved wheel structure is shown in Fig. 37, Sheet 5, to consist of a chain 51 which very loosely incloses transversely the outer surface of the outer casing sections and the ends of which are united to apertured ears 52 on opposite sides of the pan, the ends of the chain being connected to the apertured ears by means of spring hooks 53. As a means for preventing the wheel from slipping on icy roads, I have illustrated in Figs. 21 and 22, Sheet 3, and Fig. 30, Sheet 4, certain forms of spikes which are conveniently and firmly attached to one side of the wheel rim so as to project beyond the circumference of the outer casing. In Figs. 21 and 22 this element consists of a spike 54 which has its lower end turned as at 55 and projected into the socket 56 formed on the outer side of the pan 18 and held in position by a set screw 57. In Fig. 30, the spike 54 is offset at the middle portion thereof to provide a recess 58 which receives the flanges 19 and 30 of the rim and outer casing sections. Integral side arms 59 extend from the spike 54 and engage the elongated bolt head 31 at such points. In this form of the device, shown in Fig. 30, the inner end of the spikes 54 is secured between apertured ears 60 which project from the outer side of the pans.

The object of the outer tire or casing segments is to save the inner segmental air bags from wear and to hold the ends of said bags together so that they cannot sway apart under the motion of the wheel and to add to the puncture-proof feature and strength of the entire combination tire which is knitted and fastened together into one composite structure. The said outer casing segments are adapted to carry an air pressure equal to or greater than the ordinary one piece automobile tire.

It will be noted that the wheel in all of its forms has neither felly nor heat-sprung iron band tire according to the usual meaning of that term.

Having described my invention in its various modifications and the manner of its construction, advantages, etc., I claim:

1. In a wheel of the type specified, a hub, a series of receptacles arranged concentrically around said hub, means for uniting said receptacles to said hub to complete the wheel, individual cushions placed in said receptacles, and an outer casing composed of a series of sections individually united to said receptacles and inclosing said cushions.

2. A wheel of the type specified, comprising a hub, a series of receptacles arranged around said hub and completing the wheel, means for uniting said receptacles individually to the hub including a series of division plates, a series of cushion members placed within said receptacles, and an outer casing consisting of a series of sections united to said receptacles and inclosing said cushion members.

3. A wheel of the type specified, comprising a hub, a series of receptacles arranged around said hub and completing the wheel, a series of division plates interposed between the abutting ends of said receptacles and uniting the same, a series of air bags inclosed within said receptacles and extending beyond the outer circumference thereof, and an outer casing composed of sections each section being united to a respective receptacle and inclosing a respective air bag.

4. In a wheel of the type specified, a hub, a disk united to said hub, a series of receptacles arranged around the outer circumference of said disk, a series of division plates arranged between the ends of said receptacles and united to said hub and to the disk, a series of cushion members in said receptacles, and an outer casing composed of individual sections each of which is united to a respective casing and incloses halves of two adjacent cushion members.

5. In a wheel of the type specified, a hub, a series of receptacles arranged around said hub, said receptacles having flanged edges, a series of division plates extended between the ends of said receptacles and united thereto and forming a connection between said receptacles and the hub and the inner ends of which embrace the circumference of the hub, a series of cushion members in said receptacles, and an outer casing consisting of a series of sections having their longitudinal edges terminating in flanges which are united to the longitudinal flanges of the receptacles.

6. In a wheel of the type specified, a hub, a disk united to said hub, a series of division plates united to said hub and said disk and extending beyond the circumference of the disk, a series of receptacles forming the wheel rim and having their ends united to said division plates, cushion members inclosed in said receptacles and forming the wheel tire, and an outer casing consisting of sections which inclose said outer casing and are united to said receptacles.

7. In a wheel of the type specified, a hub, a series of receptacles arranged around said hub and united thereto, division plates to which the ends of said receptacles are united, cushion members in said receptacles forming the wheel tire, and an outer casing consisting of sections which are united to said receptacles and overlap the abutting ends of said receptacles.

8. In a wheel of the type specified, a hub, a disk united to said hub and having a series of pockets around its circumference, cushion members inclosed in said pockets, and an outer casing consisting of a series of sections united to said pockets and inclosing the cushion members.

9. In a wheel of the type specified, a hub, a series of segmental receptacles united to said hub, a series of segments inclosed within said receptacles and forming an elastic tire, and outer casing segments inclosing said tire segments and the ends of which terminate midway of the lengths of two adjacent elastic tire segments, said casing segments being united to the said receptacles.

10. In a wheel of the type specified, a hub, a disk united to said hub having its circumferential edge slotted, a series of receptacles forming the wheel rim, a series of division plates united to the abutting ends of said receptacles and to the hub, said division plates having their inner ends slotted to extend over the sides of said disk, a series of tire segments placed in said receptacles and forming the tire of the wheel, and an outer casing consisting of a series of segments inclosing said tire segments and united to said receptacles, said outer casing segments being extended over the adjacent ends of the segmental tire receptacles.

11. A wheel of the type specified, a series of receptacles forming a rim, segmental members mounted in said receptacles and forming a tire, and a series of segments inclosing said tire segments and forming an outer casing, each of said casing segments being united to two of said receptacles thereby covering the abutting ends of said receptacles.

In testimony whereof I affix my signature in presence of two witnesses.

WILLIAM H. YOUNG.

Witnesses:
HANNA WIZENBACHER,
GEO. R. YOUNG.